United States Patent [19]

Rodgers et al.

[11] 3,946,967

[45] Mar. 30, 1976

[54] STABILIZED TRANSPORTATION MACHINE

[75] Inventors: Aubrey Rodgers, Huntsville; Escar L. Bailey, Athens; Rayburn K. Widner, Arab, all of Ala.

[73] Assignee: The United States of America as represented by the Secretary of the Army, Washington, D.C.

[22] Filed: Feb. 4, 1975

[21] Appl. No.: 546,970

Related U.S. Application Data

[63] Continuation-in-part of Ser. No. 438,919, Feb. 1, 1974, abandoned.

[52] U.S. Cl. .............................. 244/3.2; 74/5.6 B
[51] Int. Cl.² ..................... F41G 7/00; G01C 19/28
[58] Field of Search ............ 244/3.22, 3.2; 74/5.6 B

[56] References Cited
UNITED STATES PATENTS

| | | | |
|---|---|---|---|
| 2,852,208 | 9/1958 | Schlesman | 244/3.22 |
| 3,165,282 | 1/1965 | Noyes | 74/5.6 B |
| 3,340,740 | 9/1967 | Hall | 74/5.6 B |
| 3,435,688 | 4/1969 | Ogren | 74/5.6 B |

*Primary Examiner*—Samuel Feinberg
*Attorney, Agent, or Firm*—Nathan Edelberg; Robert P. Gibson; William P. Murphy

[57] ABSTRACT

A transportation machine such as a ballistic missile disposed for operation in a linear path is provided with a chassis including an aerate atmosphere and a gyroscopic rotor for development therearound of a pressurized aerate ring and for axial orientation in the linear path. A stabilizer develops signals responsive to differences in pressures between the aerate atmosphere and the pressurized ring for rotation of the chassis to axial coincidence with the rotor responsive to the signals.

5 Claims, 3 Drawing Figures

STABILIZED TRANSPORTATION MACHINE

CROSS-REFERENCE TO RELATED APPLICATION

This is a continuation-in-part of our earlier application Ser. No. 438,919, filed Feb. 1, 1974, now abandoned.

BACKGROUND OF THE INVENTION

Current stabilizers require pressurized fluid supply sources and various methods are used to measure the effect of streams of the pressurized fluid directed against a gyroscopic rotor. All such devices tend to degrade the gyroscope performance and consequently the output signal of the stabilizer by causing the gyroscope rotor to case erect. Also the externally pressurized jet streams of many of the devices cause turbulent conditions in pickoffs resulting in undesirable noise in the output signal thereof.

SUMMARY OF THE INVENTION

The ability of a gyroscopic rotor operating in the gaseous atmosphere of a container to develop a pressurized encircling ring of the gas is utilized in the current device. Spaced probes sample the gas in the aerate atmosphere and in the ring and torques are applied to restore the container to axial coincidence with the rotor responsive to inequalities in the probe pressures.

DESCRIPTION OF THE PREFERRED EMBODIMENT

Figure 1:
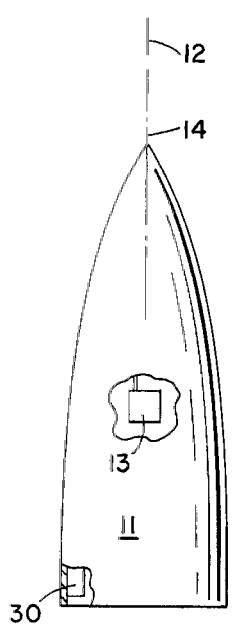
FIG. 1 is an elevation view of a ballistic missile transportation machine.

A transportation machine such as ballistic missile 11 disposed for powered operation in the linear portion 12 of a trajectory is provided with a chassis 13 having an axis 14 and enclosing an aerate atmosphere 15. A gyroscopic rotor 17 in regular spherical frustum form is disposed for rotation about an axis 18 supported by air jets 19 in a spherical bearing 21 with a center 22. A device 23 for caging rotor 17 and spaced jets 25 are simultaneously activated through conduit 26 respectively for uncaging rotor 17 and for impinging on buckets 27 for rotation of rotor 17 to a normal speed, after which rotor 17 is permitted to coast. Pairs of similar coplanar sensors 29 are disposed on chassis 13 in quadrature relation with chassis axis 14 (one pair is shown) for sampling the pressures of the aerate atmosphere and of the pressurized aerate ring developed around rotor 17 by rotation thereof.

Figure 2:
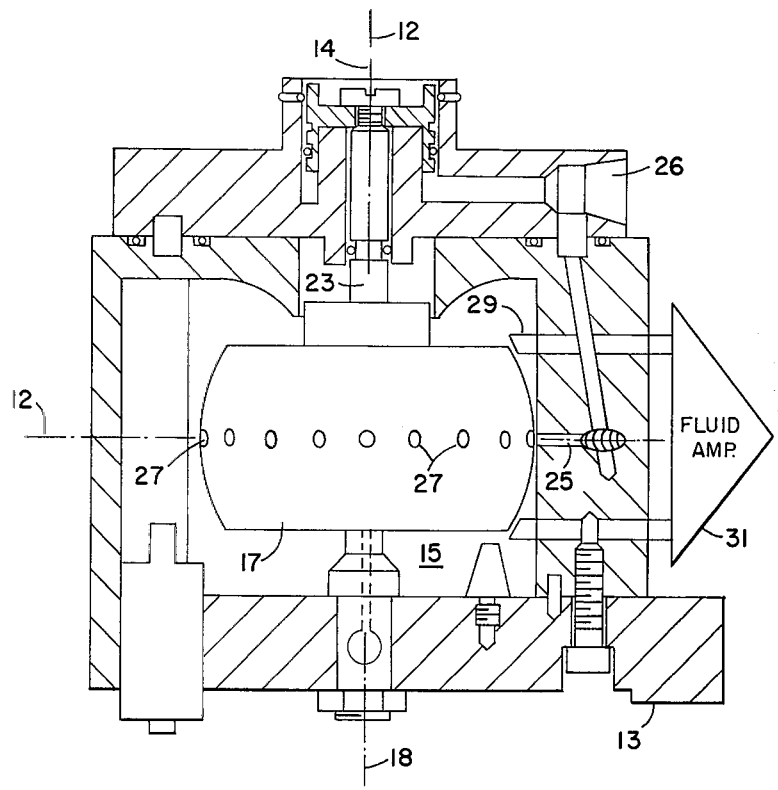
FIG. 2 is a sectional view of the transportation machine of FIG. 1.

In operation, rotor axis 18 is aligned with linear path 12 as shown in FIG. 2 and deviations of chassis axis 14 from coaxial relation with rotor axis 18 are reflected in differences in pressures between the coplanar sensors 29 of the pairs to provide signals for augmentation in amplifier 31. Chassis 13 is provided with jets 30 corresponding to the sensor pairs to rotate chassis 13 for alignment of axes 14 and 18 responsive to the augmented signals.

Figure 3:
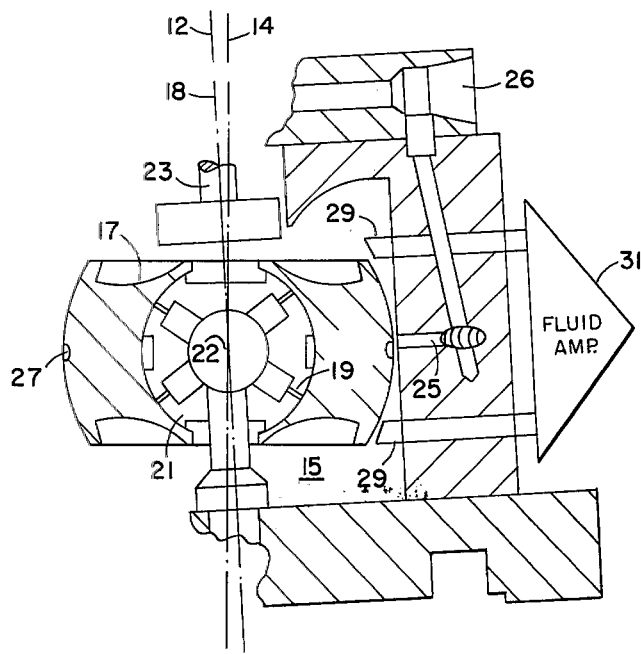
FIG. 3 is a partial sectional view of the transportation machine chassis in misalignment with the rotor.

FIG. 2 is depicted with chassis axis 14 and rotor axis 18 coincident as caging device 14 is retracted. Rotor 17 is in zero imbalance since equal pressures are developed in sensors 29 for transportation machine 11 to proceed along linear path 12. FIG. 3 reflects maximum imbalance of rotor 17 with the upper sensor 29 shown reflecting only the ambient pressure of chassis 13 while the lower sensor 29 includes full pressure from the aerate ring.

As shown in FIG. 3, axis 14 has been diverted from coincidence with axis 18 due to external forces to set up maximum imbalance between upper sensor 29 shown as sensing aerate atmosphere 15 and lower sensor 29 sensing the aerate ring developed around rotor 17. Positions of rotor 17 between FIGS. 2 and 3 reflect imbalances in the pressures sensed by sensors 29 to activate the chassis jets for rotation of axis 14 about center 22 to coincidence with axis 18.

We claim:

1. A transportation machine for operation in a linear path comprising:
   a chassis for enclosing an aerate atmosphere and a regular frustumed spherical gyroscopic rotor disposed for axial direction in the linear path and for development therearound of a pressurized aerate ring; and,
   a stabilizer with means for development of signals responsive to differences in pressures between said ring and said atmosphere and means for rotation of said chassis to axial coincidence with said rotor responsive to said signals.

2. A transportation machine as in claim 1 comprising: a missile for operation in the linear portion of a trajectory.

3. A transportation machine as in claim 1 with said development means including pairs of coplanar probes disposed in said chassis in peripheral quadrature relation to said rotor to provide said differences between pressures in the coplanar probes.

4. A transportation machine as in claim 3 with said signal development means including an amplifier for augmentation of said signals.

5. A transportation machine as in claim 4 with jets disposed on said chassis for said rotation.

* * * * *